United States Patent [19]

Collier-Hallman et al.

[11] Patent Number: 5,198,981
[45] Date of Patent: Mar. 30, 1993

[54] CLOSED-LOOP TORQUE CONTROL FOR ELECTRIC POWER STEERING

[75] Inventors: Steven J. Collier-Hallman, Frankenmuth; Julie A. Kleinau, Bay City, both of Mich.

[73] Assignee: General Motors Corporation, Detroit, Mich.

[21] Appl. No.: 594,468

[22] Filed: Oct. 9, 1990

[51] Int. Cl.$^5$ .............................................. B62D 5/04
[52] U.S. Cl. .............................. 364/424.05; 180/79.1
[58] Field of Search .................. 364/424.05; 180/79.1, 180/140, 141, 142, 143; 74/388 PS

[56] References Cited

U.S. PATENT DOCUMENTS

| | | | |
|---|---|---|---|
| 4,415,054 | 11/1983 | Drutchas | 180/79.1 |
| 4,476,529 | 10/1984 | Nakamura et al. | 364/424 |
| 4,509,611 | 4/1985 | Kade et al. | 180/79.1 |
| 4,522,278 | 6/1985 | Kitagawa et al. | 180/79.1 |
| 4,574,903 | 3/1986 | Hashimoto et al. | 180/79.1 |
| 4,624,335 | 11/1986 | Shiraishi et al. | 180/142 |
| 4,657,103 | 4/1987 | Shimizu | 180/142 |
| 4,664,211 | 5/1987 | Oshita et al. | 180/142 |
| 4,715,461 | 12/1987 | Shimizu | 180/79.1 |
| 4,727,950 | 3/1988 | Shimizu | 180/79.1 |
| 4,753,310 | 6/1988 | Hashimoto | 180/79.1 |
| 4,756,376 | 7/1988 | Shimizu | 180/79.1 |
| 4,800,974 | 1/1989 | Wand et al. | 180/79.1 |
| 4,800,976 | 1/1989 | Okada et al. | 180/142 |
| 4,803,629 | 2/1989 | Noto et al. | 364/424.05 |
| 4,828,061 | 5/1989 | Kimbrough et al. | 180/79.1 |
| 4,842,089 | 6/1989 | Kimbrough et al. | 180/79.1 |
| 4,875,539 | 10/1989 | Abukawa et al. | 180/79.1 |
| 4,961,474 | 10/1990 | Daido et al. | 180/79.1 |
| 5,076,381 | 12/1991 | Daido et al. | 180/79.1 |
| 5,097,918 | 3/1992 | Daido et al. | 364/424.05 |

FOREIGN PATENT DOCUMENTS 2507142  10/1982  France .

Primary Examiner—Gary Chin
Attorney, Agent, or Firm—Anthony L. Simon

[57] ABSTRACT

A control system for electric power steering develops a desired operator exerted steering torque command independent of operator exerted torque, compares that command to a measure of actual operator exerted steering torque and controls an electric motor providing electric power steering assist to minimize the difference between the desired operator exerted steering torque command and the actual operator exerted steering torque.

19 Claims, 4 Drawing Sheets

CLOSED-LOOP TORQUE CONTROL FOR ELECTRIC POWER STEERING

This invention relates to electric power steering apparatus for automotive vehicles and more particularly to a method and apparatus for controlling electric power steering assist through closed loop control of steering torque felt by a vehicle operator.

BACKGROUND OF THE INVENTION

Electric power steering systems generally include torque transducers for sensing torque exerted on the steering wheel by the vehicle operator and various other sensors to measure various other parameters. Typically these types of systems develop a torque assist command in response to operator exerted torque and various other vehicle parameters and this torque assist command controls current to an electric motor which provides torque assist to the vehicle steering.

The response of electric power steering systems which generate torque assist commands in response to exerted torque may vary from vehicle to vehicle or within the same vehicle as parts begin to wear. Tire load may vary in response to different road surfaces, wind conditions, driving maneuvers, and passenger loads. An operator in a vehicle with such a system will feel these changes through variations in effort required to steer the vehicle. Previous methods to compensate for these steering system variations have included adding complex circuitry and control structure to the systems to offset different variations in the system. The result is that the expense and complexity of these systems begin to outweigh the benefits.

SUMMARY OF THE PRESENT INVENTION

The present invention includes a method and apparatus for providing closed loop control of torque assist supplied by electric power steering systems. By providing closed loop control of torque assist, the invention sets forth a means to compensate for variations in steering systems and tire load with minimum complexity. The benefits of the present invention also include the ability to take the road and steering system feel out of the hands of the operator and replace that feel with a programmed feel, which provides more comfortable steering to the vehicle operator.

The method of the present invention includes the determination of steering shaft pinion gear angle (or steering wheel angle, which is an equivalent parameter) and vehicle speed. In the preferred implementation of the invention, pinion gear velocity (or steering wheel velocity), in RPMs, is determined as a time derivative of pinion gear (or steering wheel) angle. In response to pinion gear angle, pinion gear velocity and vehicle speed, a steering torque command is developed. The steering torque command is representative of steering effort that it is desired for the vehicle operator to feel, the target operator exerted steering torque. A closed loop control of steering torque is then achieved by comparing a measure of the torque actually exerted by the vehicle operator on the steering wheel to the steering torque command and, in response to this comparison, developing an error signal which controls the steering torque assist provided by an electric motor. The electric motor is controlled in a manner to minimize the difference between the actual steering effort exerted by the vehicle operator and the desired steering effort.

The apparatus of the present invention includes means for measuring the pinion gear (or steering wheel) angle, vehicle speed, and steering torque. There is also means for developing the steering torque command and for comparing the steering torque command to a measure of actual steering torque exerted by the vehicle operator and developing the torque error signal in response to the comparison. A third means controls the electric motor to apply torque assist to the vehicle steering in response to the torque error signal. Various other improvements of the present invention are set forth in the detailed description below.

DETAILED DESCRIPTION OF THE INVENTION

Figure 1:
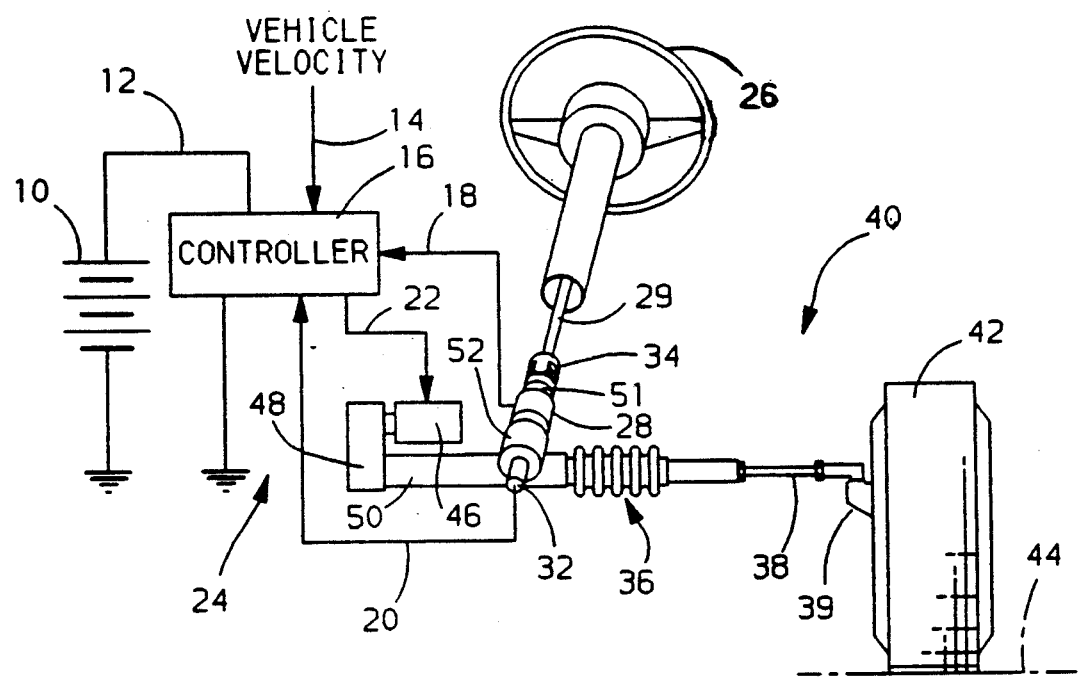
FIG. 1 is a schematic diagram showing a controller and a power steering system for implementation of the present invention.

Referring to FIG. 1, reference numeral 40 generally designates a motor vehicle power steering system suitable for implementation of this invention. The steering mechanism 36 is a rack-and-pinion type system and includes a toothed rack (not shown) and a pinion gear (also not shown) located under gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack which moves tie rods 38 (only one shown) in turn moving the steering knuckles 39 (only one shown) which turn wheels 42 (only one shown).

Electric power steering assist is provided through the unit generally designated by reference numeral 24 and includes the controller 16 and the electric motor 46. The controller 16 is powered by the vehicle power supply 10 through line 12. The controller receives a signal representative of vehicle velocity on line 14. Steering pinion gear angle is measured through position sensor 32, which may be an optical encoding type sensor, variable resistance type sensor, or any other suitable type of position sensor, and fed to the controller 16 through line 20. In the preferred implementation, the controller 16 determines the pinion gear velocity by calculating the rate of change of position sensed by sensor 32.

As the steering wheel 26 is turned, torque sensor 28 senses the torque applied to the steering wheel 26 by the vehicle operator. The torque sensor 28 may include a torsion bar (not shown) and a variable resistive-type sensor (also not shown) which outputs a variable resistance signal to controller 16 through line 18 in relation to the amount of twist on the torsion bar. Although this is the preferable torque sensor, any other suitable torque sensing device will suffice.

The output of the torque sensor is a range of voltages, e.g., 0-5 volts, with a midpoint in the voltage range corresponding to a zero turn angle of the steering wheel. However, because of changing environmental conditions and sensor wear, the position of the sensor which corresponds to the zero signal may vary. U.S. Pat. No. 4,509,611, to Kade et al. and assigned to the assignees of the present invention, is directed to a method of operation of steering torque transducers to compensate for drift errors over time and is herein incorporated into the present specification by reference.

In response to the inputs on lines 14, 18 and 20, the controller sends a current command to the electric motor 46 which supplies torque assist to the steering system through gear box 48. In the gear box 48, the motor 46 preferably turns a gear (not shown) which drives a ball nut (not shown) which moves a ball screw (also not shown) under housing 50, providing torque assist to the vehicle steering.

Figure 2:
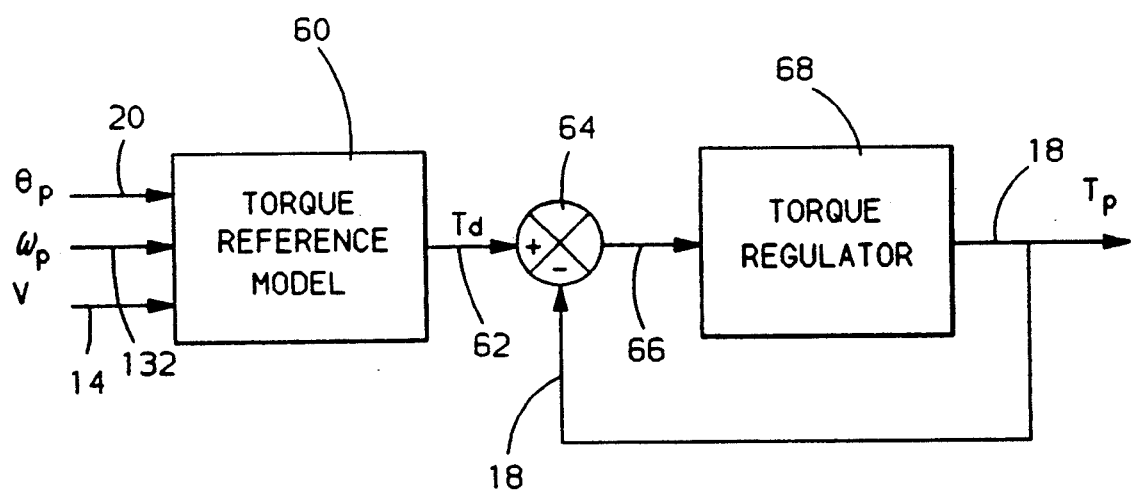
FIG. 2 is a control diagram for implementation of the present invention including a torque reference model and a torque regulator.

The control method of this invention can be understood with reference to FIG. 2. In the controller 16 (FIG. 1), a torque reference model 60 generates a desired torque signal on line 62 in response to the measured values for the pinion angle, $\theta_p$ (line 20), and vehicle speed, V (line 14), and in response to pinion velocity, $\omega_p$ (line 132), developed as a time derivative of pinion angle $\theta_p$. The desired torque signal on line 62 indicates the amount of torque that it is desired that a vehicle operator exert to turn the steering wheel at the present steering wheel angle while the vehicle is traveling at the present vehicle velocity.

The desired torque signal is compared, at summation block 64, to a measure of the actual operator exerted torque on line 18 as sensed by torque sensor 28 (FIG. 1). In response to this comparison, a torque error signal is generated on line 66 and input into the torque regulator 68. In brief, the torque regulator 68 generates a current command for the electric motor 46 (FIG. 1) which provides torque assist to the steering system 40 (FIG. 1), to minimize the difference between the torque measured on line 18 and the torque desired on line 62. The resultant torque felt by the driver (and measured by sensor 28) is indicated by line 18.

While referring to FIG. 2, one skilled in the art can easily discern the benefits of this invention. The desired torque to be felt by the driver is determined by the reference model 60 in response to pinion angle and vehicle velocity. Since the desired torque command on line 62 is independent of actual torque on the steering system, the reference model may be built or programmed so that steering effort required by the vehicle operator to steer the system is virtually independent of the energy required to steer the vehicle. The closed loop torque control of this invention through line 18, summation block 64, and block 68 provides means for the actual torque (steering effort) felt by the vehicle operator to substantially equal the desired torque designed or programmed into the torque reference model 60.

Figure 3A:
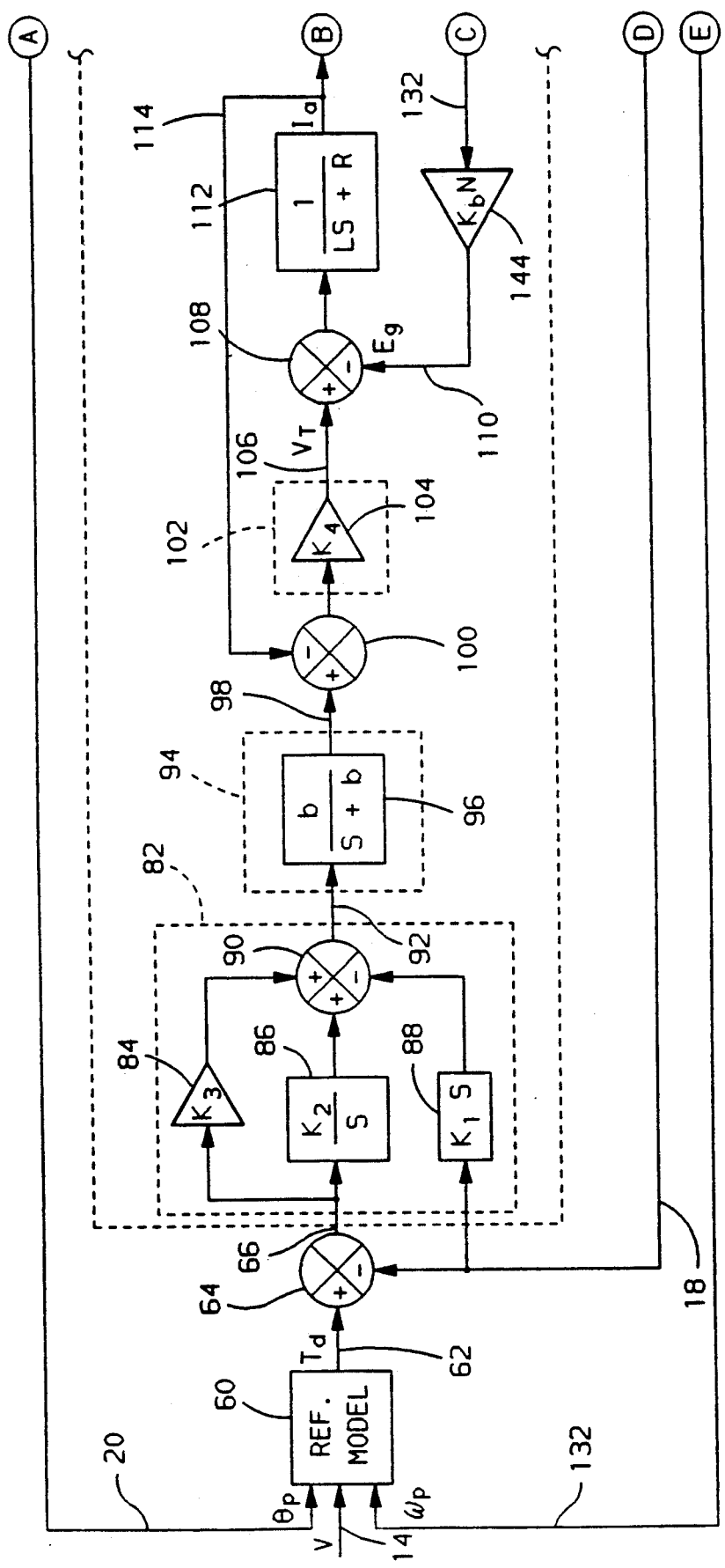
FIGS. 3a and 3b comprise a control diagram showing a detailed schematic of one example of the torque regulator.
Figure 3B:
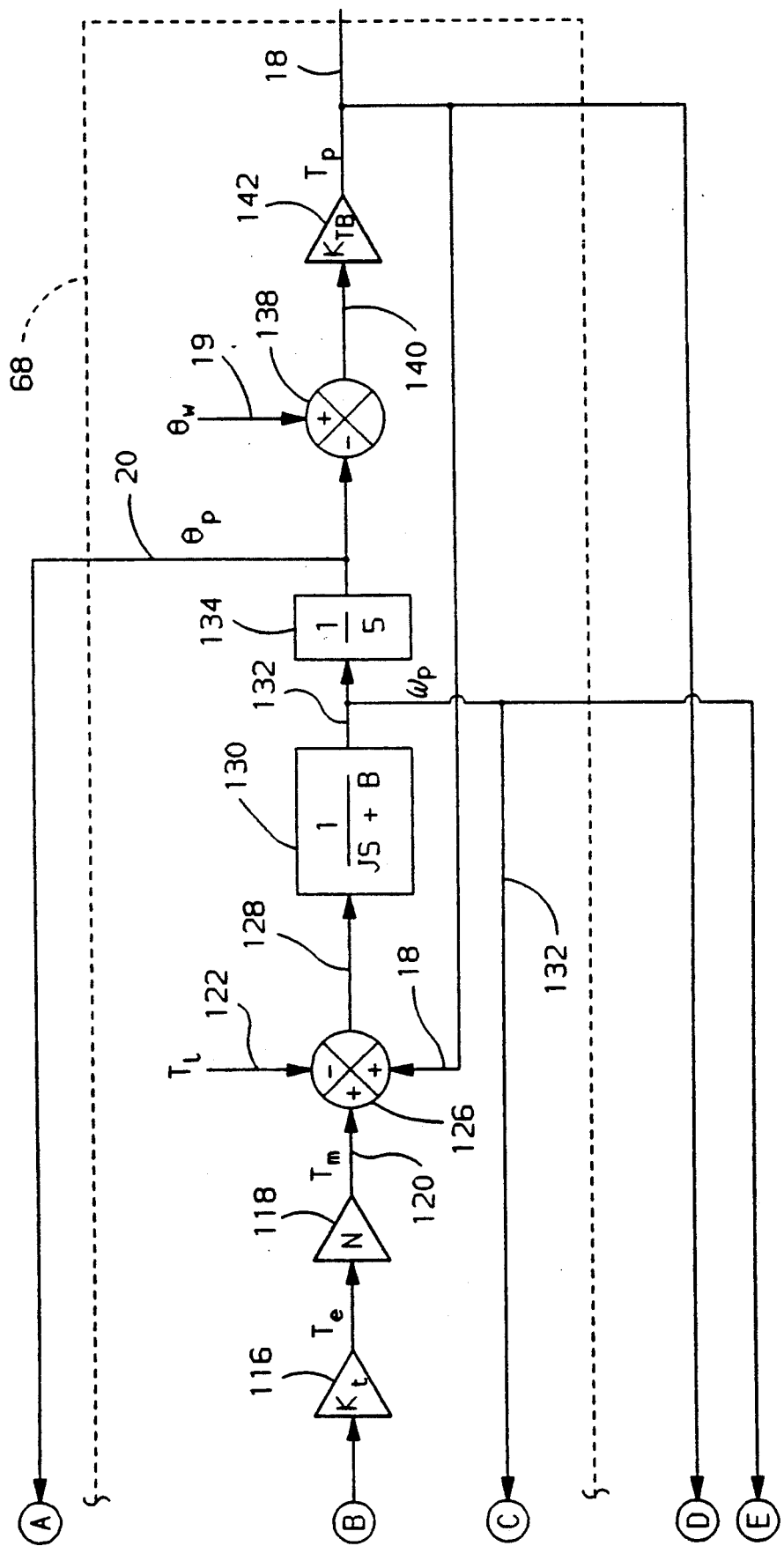

The torque regulator 68 may be better understood with reference to FIGS. 3a and 3b, showing the preferred implementation of the invention. In the controller 16 (FIG. 1), the torque error signal on line 66 enters PID controller 82, containing a proportional component 84 which multiplies the error signal by a factor $K_3$, integral component 86 which integrates the error signal through a function $K_2/s$, and derivative component 88 which differentiates the pinion torque signal (line 18) through a function $K_1 s$ (although the implementation shown is preferred, the derivative component 88 may differentiate the error signal on line 66 instead of the pinion torque signal on line 18). The results of blocks 84 and 86, and a negative of the result of block 88 are all summed at block 90. The resultant sum signal on line 92 is passed through a low pass filter 94, which performs the filtering function in block 96, (b/(s+b)), and the output of the filter on line 98 is the desired electric current for driving electric motor 46 (FIG. 1). Summation block 100 and block 102 comprise a current controller for the motor 46. The actual motor current on line 114 is subtracted from the desired motor current on line 98 and the result is multiplied by a constant $K_4$ at block 104 to get the motor terminal voltage $V_t$ on line 106.

The rest of the control diagram in FIGS. 3a and 3b (everything right of block 102) is a control model representing the steering system 40 in FIG. 1 and is not part of the controller 16 (FIG. 1). The motor terminal voltage on line 106 is summed with the back EMF voltage on line 110 caused by the rotation of the motor. The rotational velocity of the pinion gear, $\omega_p$, is represented by line 132 and the back EMF of the motor 46 is calculated by multiplying the motor back EMF constant $K_B$ and the motor-pinion gear ratio by the rotational velocity of the pinion gear, $\omega_p$.

Summation block 108 represents the subtraction of the back EMF voltage from the terminal voltage of the motor. Block 112 represents the operation of the motor parameters on the net voltage of the motor where the actual motor current equals the net motor voltage operated on by the function $1/(LS+R)$ where L is the motor inductance and R is the motor and harness resistance. Line 114 represents the actual motor current.

Gain block 116 shows the relationship of the motor output torque, $T_e$, to the actual input current, $I_a$, and block 118 represents the gear ratio, N, between the motor and pinion gear so that line 120 represents the motor torque assist, $T_m$, on the pinion gear. Summation block 126 represents the addition of all the torques operating on the pinion gear. Line 18 represents the torque supplied by the vehicle operator steering effort, $T_p$, and line 122 represents the vehicle load torque on the pinion gear, $T_l$, such that line 128 represents a net torque, $T_n$, where:

$$T_n = T_m + T_p - T_l.$$

Box 130 represents the effects of inertia and friction of the system as the function $1/(Js+B)$ where:

$$J = J_m N^2 + J_r,$$

$$B = B_m N^2 + B_r, \text{ and}$$

where $J_m$ is the motor inertia, $J_r$ is the rack and pinion inertia, $B_m$ is the viscous damping constant of the motor and $B_r$ is the viscous damping constant of the rack and pinion. Line 132, out of box 130, represents the pinion angular velocity, $\omega_p$, and the pinion angle, $\theta_p$, on line 20, is an integration over time (box 134) of pinion velocity and is the same pinion angle sensed by sensor 32 (FIG. 1).

Summation block 138 and gain block 142 show the relation between pinion angle, $\theta_p$, steering wheel angle, $\theta_w$, and torque felt by the vehicle operator, $T_p$. The torque felt by the vehicle operator, $T_p$, is a function, $K_{tb}$, of the twist of the torsion bar, e.g., the difference between the steering wheel angle, $\theta_w$, on line 19, and the pinion angle, $\theta_p$, on line 140, when a torsion bar is used in the system. If another type of torque sensor is used, this portion of the model would differ accordingly.

With reference to the above control description, one skilled in the art can easily see how the torque felt by the vehicle operator, $T_p$, is regulated. The difference between the reference model command, line 62, and the torque, $T_p$ on line 18, is used to generate a current control command for the motor 46 (FIG. 1) on line 98. The motor 46 applies torque on the pinion altering the torque felt by the vehicle operator through the steering wheel 26 to a desired value.

The reference model 60 may be any of a variety of command generators including a four dimensional lookup table in computer memory. Such a lookup table, however, is apt to take up a large amount of space in computer memory. Simpler function generators can serve as the reference model and preferred examples of such are illustrated in FIGS. 4 and 5.

Figure 4:
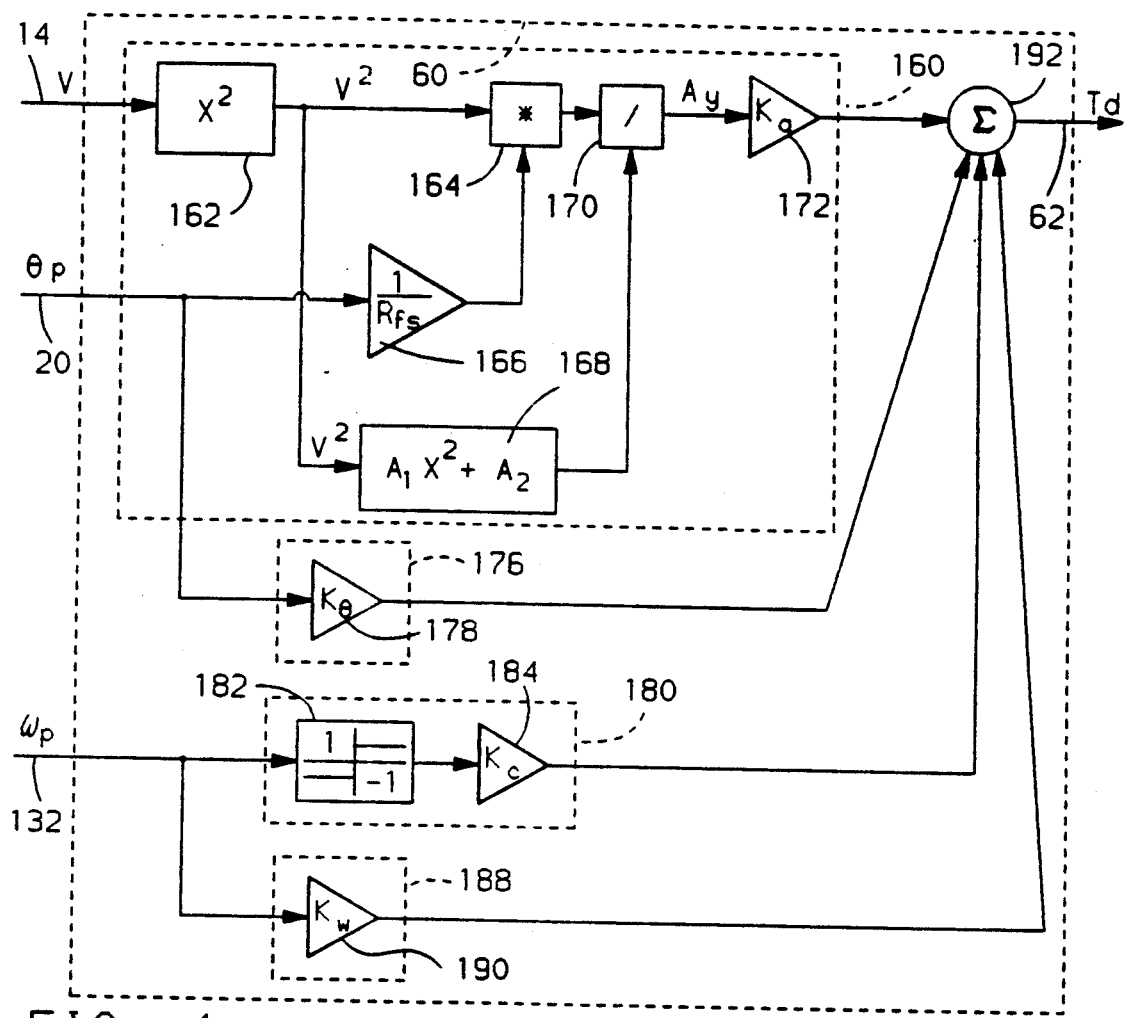
FIG. 4 is a control diagram showing a detailed schematic of one example of the torque reference model.
Figure 5:
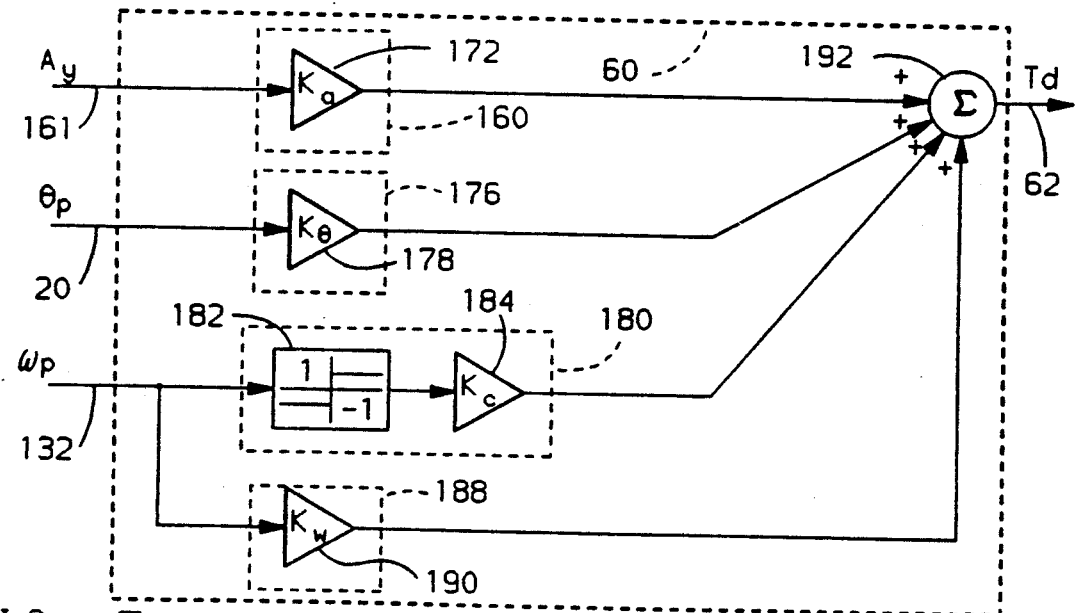
FIG. 5 is a control diagram showing a detailed schematic of a second example of the torque reference model.

Referring now to FIG. 4, the reference model 60 shown has four basic components, block 160, block 176, block 180 and block 188. Block 160 approximates the lateral acceleration of the vehicle, block 176 performs a steering wheel angle proportionality function, block 180 approximates the Coulombic friction of the vehicle tires on the road, and block 188 takes into account the effects of viscous friction in the system. A desired torque command can be modeled in relation to all four of the above functions.

Block 160 implements a suitable approximation for lateral acceleration of a vehicle, $a_y$:

$$a_y = V^2(\theta_p/R_{fs})/(L_w(1+(MV^2/L_w^2)(b/C_f - a/C_r))),$$

where V is the vehicle velocity, $R_{fs}$ is the front steer ratio (pinion angle/front wheel angle), $L_w$ is the wheel base of the vehicle, M is the mass of the vehicle, a is the distance from the center of gravity of the vehicle to the front axle, b is the distance from the center of gravity of the vehicle to the rear axle, $C_f$ is the front cornering coefficient, and $C_r$ is the rear cornering coefficient. The above equation is simplified in implementation because all of the variables except V and $\theta_p$ are constant for a particular vehicle. Blocks 162, 164, 166, 168, and 170 perform the functions involved in calculating the lateral acceleration $a_y$. Block 162 squares vehicle velocity, V, block 166 multiplies the pinion angle, $\theta_p$, by an inverse of the front steer ratio, $1/R_{fs}$, and block 164 multiplies the square of the vehicle velocity by the result of block 166. Block 168 performs the function $(a_1x^2+a_2)$ on the vehicle velocity to get the denominator in the above equation $(a_1=(M/L_w)(b/C_f-a/C_r)$ and $a_2=L_w)$ and the ratio of the numerator and the denominator, $a_y$, is computed at block 170. Block 172 scales the lateral acceleration by a factor $K_a$.

In block 176, again block 178 scales the pinion angle by a factor $K_\theta$ to develop a relation between the torque command $T_d$ and steering angle, $\theta_p$. This portion of the desired torque command is most prominent at low vehicle speeds. In block 180, the pinion velocity, $\omega_p$, on line 132 is replaced by a 1 or $-1$ for left or right steer at block 182 and scaled by a Coulombic friction factor, $K_c$, which may vary with vehicle speed, at block 184. The signal on line 132 may be run through a low pass filter (not shown) to smooth out the pinion velocity signal.

The pinion velocity is scaled (block 190) by a factor, $K_w$, in box 188 to develop the relation between the desired viscous friction characteristics of the system and desired torque.

Summation block 192 combines the various components of the desired torque command and the torque reference model 60 outputs the resultant command on line 62 where it is compared to the actual torque felt by the vehicle operator as explained above.

In the above model steering angle and torque in one direction are treated as positive values and steering angle and torque in the opposite direction are treated as negative values. Circuit equivalents for the portions of the controller shown in the diagrams and explained above may be easily implemented by one skilled in the art in either analog or digital circuitry and will therefore not be set forth in further detail herein.

The motor 46 in FIG. 1 may be any suitable electric motor but is preferably a six step brushless DC motor driven by pulse width modulation techniques through a six transistor motor driver. Current through the motor 46 is controlled to change the direction and intensity of the torque assist provided by the motor. Since these and equivalent motors and standard driver circuitry are well known to those skilled in the art, no further details of the motor or driver circuitry will be set forth herein.

The above described example is just one implementation of the present invention, which encompasses a wide variety of implementations. For example the derivative control portion 88 in block 82 in FIG. 3a may be replaced by a proportional control block multiplying pinion speed on line 132 by a proper gain term and summing the result in block 90. Either implementation is acceptable since both allow the controller to respond quickly to driver demand. The torque reference model shown above responds to pinion angle and vehicle speed (and pinion velocity). An equivalent system may use steering wheel angle instead of pinion gear angle since the two may be treated as equivalents (the range of torsion bar twist is usually limited to $+/-2.5$ degrees, so $\theta_p$ is approximately equal to $\theta_w$). In steering systems different from rack and pinion type, equivalent steering angles are used in the control method. Additionally, instead of differentiating pinion position to get pinion velocity, a sensor, such as those used in tachometers, may be used to directly measure pinion gear velocity.

Referring now to FIG. 5, in a vehicle in which there is a lateral acceleration sensor, there is no need to compute lateral acceleration. A signal from the lateral acceleration sensor (not shown) is input into the reference model on line 161 and is scaled in block 160. The remainder of the reference model shown in FIG. 5 is identical to that shown in FIG. 4 and computes the desired torque command, $T_d$, on line 62. Lateral acceleration sensors are commercially available and any suitable sensor may be easily implemented into the above described control system by one skilled in the art.

Various other improvements and/or modifications of the above-described example will occur to those skilled in the art and will fall within the scope of this invention as set forth below.

The embodiments of the invention in which an exclusive property or privilege is claimed are defined as follows:

1. A method for controlling an electric power steering system in a vehicle comprising the steps of:

measuring steer angle and vehicle speed;

developing, in response to the measured steer angle and vehicle speed, a steering torque command representative of a target operator exerted steering torque;

comparing the steering torque command to a measure of actual operator exerted steering torque and developing a torque error signal in response to the comparison; and controlling an electric motor to apply torque assist to the vehicle steering system in response to the torque error signal, increasing said torque assist if the actual operator exerted steering torque is greater than the target operator steering torque and decreasing said torque assist if the actual operator exerted steering torque is less than the target operator steering torque thereby to minimize the torque error signal and bring the actual operator exerted steering torque into substantial agreement with the target operator exerted steering torque.

2. The method in claim 1 also including the step of differentiating the measured steer angle over time to develop a steer velocity signal and wherein the steering torque command is also developed in response to said steer velocity signal.

3. The method in claim 1 also including the step of measuring steer velocity wherein the steering torque command is also developed in response to the measured steer velocity.

4. The method in claim 2 wherein the measured steer angle is a measure of steering wheel angle.

5. The method in claim 2 wherein the measured steer angle is an angular measure of position of a pinion gear mechanically coupled to a steering shaft and a steering rack.

6. An apparatus for controlling an electric power steering system in a vehicle comprising:

means for measuring steering wheel angle and vehicle speed;

means for developing a steering wheel velocity signal as a time derivative of said measured steering wheel angle;

means for developing, in response to the measured steering wheel angle and vehicle speed and in response to the steering wheel velocity signal, a steering torque command representative of a target operator exerted steering torque and for comparing the steering torque command to a measure of actual operator exerted steering torque and developing a torque error signal in response to the comparison; and means for controlling an electric motor to apply torque assist to the vehicle steering system in response to the torque error signal, increasing said torque assist if the actual operator exerted steering torque is greater than the target operator exerted steering torque and decreasing said torque assist if the actual operator exerted steering torque is less than the target operator steering torque thereby to minimize the torque error signal and bring the actual operator exerted steering torque into substantial agreement with the target operator exerted steering torque.

7. The apparatus in claim 6 wherein the vehicle steering system includes a steering wheel and a steering shaft, and wherein:

the means for measuring steering wheel angle includes a steering wheel angle sensor;

the means for developing a steering torque command includes a reference model of desired steering performance;

the measure of operator exerted steering torque is determined from a torque sensor which senses torque on the steering shaft; and the means for controlling the electric motor includes a current regulator which provides a drive current to the electric motor in response to the torque error signal.

8. An apparatus for controlling an electric power steering system in a vehicle comprising:

means for measuring steering pinion gear angle of a steering pinion gear mechanically coupled to a steering shaft and a steering rack;

means for developing a pinion gear velocity signal as a time differentiation of said steering pinion gear angle;

means for developing, in response to the measured steering pinion gear angle and vehicle speed and in response to the pinion gear velocity signal, a steering torque command representative of a target operator exerted steering torque and for comparing the steering torque command to a measure of actual operator exerted steering torque and developing a torque error signal in response to the comparison; and means for controlling an electric motor to apply torque assist to the vehicle steering system in response to the torque error signal, increasing said torque assist if the actual operator exerted steering torque is greater than the target operator exerted steering torque and decreasing said torque assist if the actual operator exerted steering torque is less than the target operator steering torque thereby to minimize the torque error signal and bring the actual operator exerted steering torque into substantial agreement with the target operator exerted steering torque.

9. The apparatus in claim 8 wherein the actual operator exerted steering torque is developed by a torque sensor that senses torque on the steering shaft, and wherein:

the means for measuring steering pinion gear angle includes a pinion gear position sensor;

the means for developing a steering torque command includes a reference model of desired steering performance; and the means for controlling the electric motor includes a current regulator which provides a drive current to the electric motor in response to the torque error signal.

10. A method for controlling an electric power steering system in a vehicle comprising the steps of:

measuring steer angle and vehicle lateral acceleration;

developing, in response to the measured steer angle and vehicle lateral acceleration, a steering torque command representative of a target operator exerted steering torque;

comparing the steering torque command to a measure of actual operator exerted steering torque and developing a torque error signal in response to the comparison; and controlling an electric motor to apply torque assist to the vehicle steering system in response to the torque error signal, increasing said torque assist if the actual operator exerted steering torque is greater than the torque operator steering torque and decreasing said torque assist if the actual operator exerted steering torque is less than the target operator steering torque thereby to minimize the torque error signal and bring the actual operator exerted steering torque into substantial agreement with the target operator exerted steering torque.

11. The method in claim 10 also including a step of differentiating the measured steer angle over time to develop a steer velocity signal and wherein the steering torque command is also developed in response to said steer velocity signal.

12. The method in claim 10 also including a step of measuring steer velocity and wherein the steering torque command is also developed in response to the measured steer velocity.

13. The method in claim 11 wherein the measured steer angle is a measure of steering wheel angle.

14. The method in claim 11 wherein the measured steer angle is an angular measure of position of a pinion gear mechanically coupled to a steering shaft and a steering rack.

15. An apparatus for controlling an electric power steering system in a vehicle comprising:
    means for measuring steering wheel angle and vehicle lateral acceleration;
    means for developing a steering wheel velocity signal as a time differentiation of said measured steering wheel angle;
    means for developing, in response to the measured steering wheel angle and vehicle lateral acceleration and in response to the steering wheel velocity signal, a steering torque command representative of a target operator exerted steering torque and for comparing the steering torque command to a measure of actual operator exerted steering torque and developing a torque error signal in response to the comparison; and
    means for controlling an electric motor to apply torque assist to the vehicle steering system in response to the torque error signal, increasing said torque assist if the actual operator exerted steering torque is greater than the target operated exerted steering torque and decreasing said torque assist if the actual operator exerted steering torque is less than the target operator steering torque thereby to minimize the torque error signal and bring the actual operator exerted steering torque into substantial agreement with the target operator exerted steering torque.

16. The apparatus in claim 15 wherein the vehicle steering system includes a steering wheel and a steering shaft, and wherein:
    the means for measuring steering wheel angle includes a steering wheel angle sensor;
    the means for developing a steering torque command includes a reference model of desired steering performance;
    the measure of operator exerted steering torque is determined from a torque sensor which senses torque on the steering shaft; and
    the means for controlling the electric motor includes a current regulator which provides a drive current to the electric motor in response to the torque error signal.

17. An apparatus for controlling an electric power steering system in a vehicle comprising:
    means for measuring steering pinion gear angle of a steering pinion gear mechanically coupled to a steering shaft and a steering rack;
    means for developing a pinion gear velocity signal as a time differentiation of said steering pinion gear angle;
    means for developing, in response to the measured steering pinion gear angle and vehicle lateral acceleration and in response to the pinion gear velocity signal, a steering torque command representative of a target operator exerted steering torque and for comparing the steering torque command to a measure of actual operator exerted steering torque and developing a torque error signal in response to the comparison; and
    means for controlling an electric motor to apply torque assist to the vehicle steering system in response to the torque error signal, increasing said torque assist if the actual operator exerted steering torque is greater than the target operator exerted steering torque and decreasing said torque assist if the actual operator exerted steering torque is less than the target operator steering torque thereby to minimize the torque error signal and bring the actual operator exerted steering torque into substantial agreement with the target operator exerted steering torque.

18. The apparatus in claim 17 wherein the vehicle steering system includes a steering wheel and a steering shaft, and wherein:
    the means for measuring steering pinion gear angle includes a pinion gear position sensor;
    the means for developing a steering torque command includes a reference model of desired steering performance;
    the measure of operator exerted steering torque is determined from a torque sensor which senses torque on the steering shaft; and
    the means for controlling the electric motor includes a current regulator which provides a drive current to the electric motor in response to the torque error signal.

19. A method for controlling an electric power steering system in a vehicle comprising the steps of:
    developing, independent of operator exerted steering torque, a steering torque command representative of a target operator exerted steering torque;
    comparing the steering torque command to a measure of actual operator exerted steering torque and developing a torque error signal in response to the comparison; and
    controlling an electric motor to apply torque assist to the vehicle steering system in response to the torque error signal, increasing said torque assist if the actual operator exerted steering torque is greater than the target operator steering torque and decreasing said torque assist if the actual operator exerted steering torque is less than the target operator steering torque thereby to minimize the torque error signal and bring the actual operator exerted steering torque into substantial agreement with the target operator exerted steering torque.

* * * * *